Patented June 18, 1929.

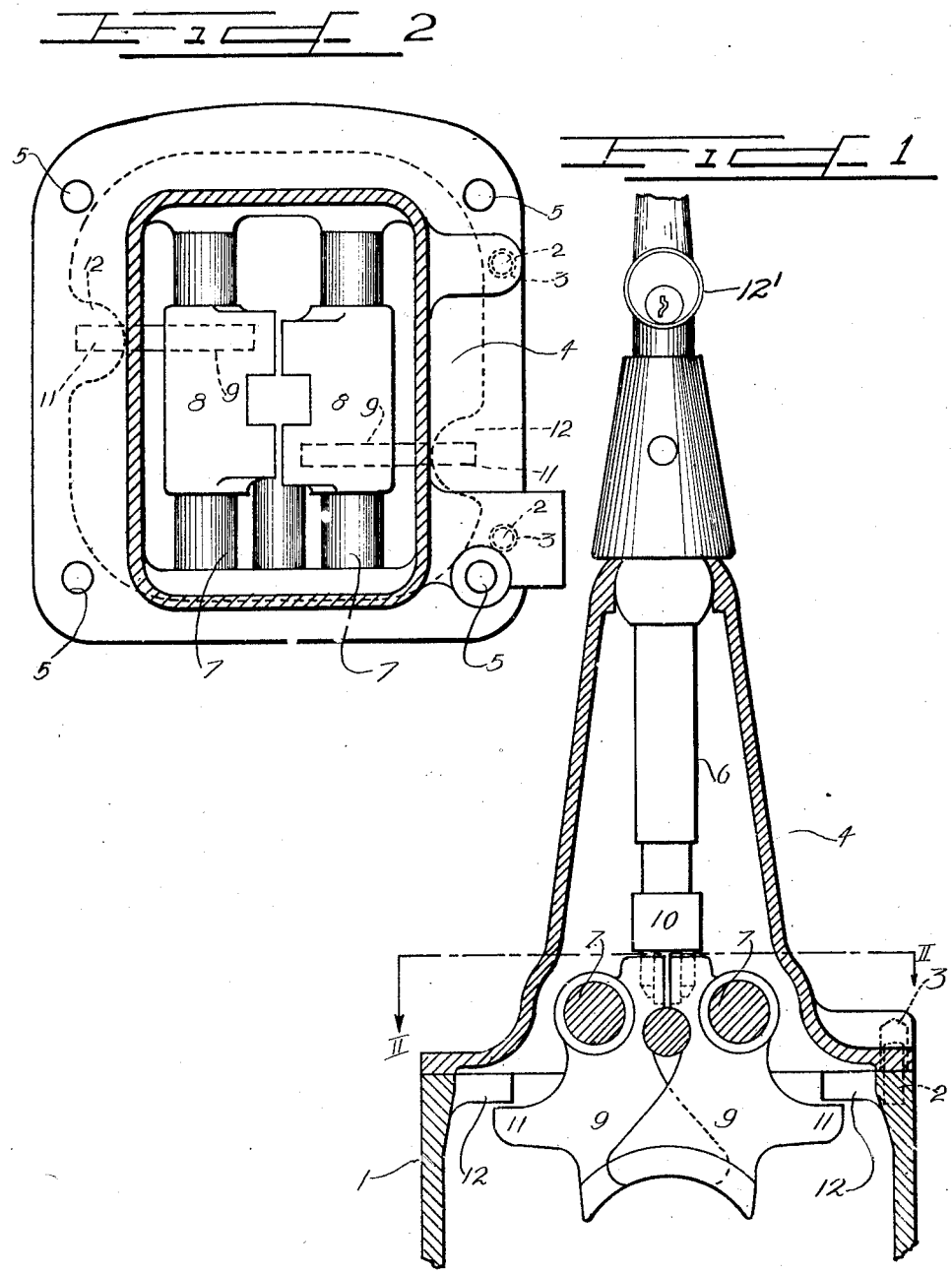

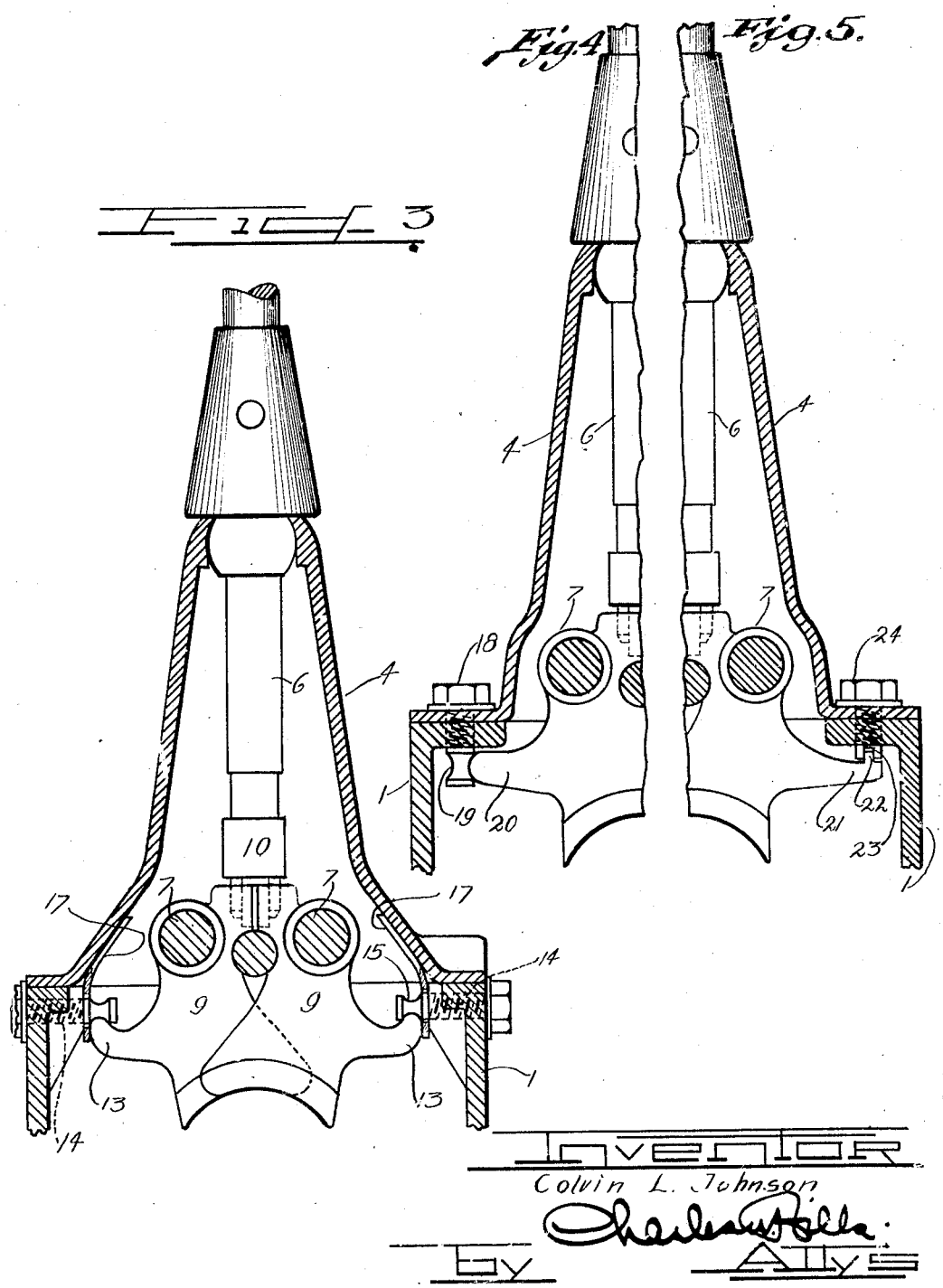

1,717,452

UNITED STATES PATENT OFFICE.

COLVIN L. JOHNSON, OF ST. LOUIS, MISSOURI, ASSIGNOR, BY MESNE ASSIGNMENTS, TO JOHNSON AUTOMOBILE LOCK COMPANY, OF ST. LOUIS, MISSOURI, A CORPORATION OF MISSOURI.

TRANSMISSION-HOUSING COVER-LOCKING MEANS.

Application filed September 5, 1925. Serial No. 54,728.

This invention relates to means for preventing the removal of transmission housing covers except when the transmission gears are in predetermined position. It is customary in order to prevent theft or unauthorized use of automobiles and other gear operated mechanisms to lock the transmission gears thereof in a predetermined position by a suitable locking means. While such means are higly successful in accomplishing their purpose, it is nevertheless possible in certain cases, to remove the transmission housing cover and the gear locking means after which the gears may be shifted from the predetermined position as desired and the mechanism driven. It is accordingly an object of this invention to provide a locking means for transmission housing covers which may only be released by shifting the transmission gears from predetermined position.

It is also an important object of this invention to provide a means inaccessible from without for preventing either vertical or lateral movement of the transmission housing cover relative to the housing, except when the gears in said housing are shifted from a predetermined position.

It is further an important object of this invention to provide a transmission housing cover having simple and efficient means thereon which may be economically manufactured and easily operated for preventing removal of said cover from the transmission housing when the gears in said housing are in a predetermined position.

It is also an important object of this invention to provide a simple locking means for the transmission housing cover which will not interfere or unnecessarily impede authorized accessibility to the parts in the housing.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary transverse section with parts removed showing an embodiment of the cover locking means of this invention.

Figure 2 is a horizontal section with parts omitted taken at the line II—II of Figure 1.

Figure 3 is a fragmentary transverse section with parts removed showing a modified form of the device of this invention.

Figure 4 is a fragmentary transverse section with parts removed showing a modification of my invention.

Figure 5 is a fragmentary sectional view of another form of my invention.

As shown on the drawings:

Reference numeral 1 indicates a transmission housing which has provided at its upper edge and rigidly secured thereto a pair of vertically extending exteriorly concealed pins 2 which are adapted to extend into respective recesses 3 therefor in a cover 4. The cover 4 and housing 1 are apertured adjacent the edges thereof as at 5 to receive retaining screws or studs (not shown) for securing said cover to said housing. The cover 4 is provided with a central upwardly extending dome portion which affords a universal support for a gear shift lever 6, the latter having a depending portion extending downwardly through the interior of the dome portion. Mounted in the cover 4 and extending longitudinally thereof are parallel rods 7 which have blocks 8 slidably mounted thereon. The adjacent faces of said blocks 8 have notches or recesses formed therein adapted to receive the lower end of the depending portion of the gear shift lever 6 and depending from said blocks and integral therewith are gear shifting forks 9 which engage transmission gears (not shown) in the casing 1 to shift said gears to a plurality of predetermined positions. When the blocks 8 are in the position shown in Figure 2 with their adjacent faces opposite each other, the gears are in neutral or inoperative position. A key operated locking means (not shown) is mounted in a suitable position relative to the gear shift lever 6. A collar 10 is provided surrounding the depending portion of the lever 6 and is connected to be raised or lowered by the key operated lock 12′ to unlocked or locked position. The mechanism for operating the collar 10 from the lock 12′ is similar to the construction disclosed in my Patent No. 15,105 for a "Gear shift lever lock" reissued May 17, 1921. The collar 10 is provided with a pair of depending locking members slidable on either side of the lower portion of the lever 6 and adapted when said collar is actuated to lowered position to fit on either side of the lower portion of the lever 6 in the respective recesses in the adjacent faces of the blocks 8 for holding the lever 6 securely in neutral or inoperative central position. When the collar 10 is raised by the key operated means, the depending lugs thereon will leave the aforementioned recesses to release the lever 6 so that the same may be actuated to shift the blocks 6 to any desired operative position. Vertically aligned with the forks 9 and integral therewith and with the blocks 8 are oppositely extending transverse projecting members 11 which extend when said blocks are in neutral position beneath integral projecting lugs 12 on opposite sides of the housing 1 at the upper inner edge thereof.

It will be observed that the shafts 7 which support the blocks 8 with the extensions 11 thereon are movable vertically with the cover and that when said blocks are in neutral position and said projections 11 are engaging beneath the projections 12 on the inner edge of the housing, said cover cannot be vertically removed even after the retaining studs have been removed from the apertures 5. When, however, the blocks 8 have been shifted to any position other than neutral, the projections 11 will no longer engage with the projections 12 and the cover 4 may be removed. It is also to be noted that the pins 2 in the blind recesses 3 will prevent any lateral shifting of the cover 4 with a view to disengaging the projections 11 from beneath the projections 12 so as to thereafter effect vertical removal of said cover from the housing. It will also be obvious that the shafts 7 might be placed in the housing 1 instead of in the cover, the projections 12 provided on the cover 4, and the projections 11 positioned to engage above the projections 12 instead of below without departing from the spirit of this invention.

In the device shown in Figure 3 there is substituted for the projections 11 outwardly extending and upwardly curved projections 13 and in place of the projections 12 there is provided removable stud screws 14 inwardly threaded into the sides of the housing 1. The screws 14 are provided with annular grooves 15 at their respective ends and are positioned in the housing so that said grooves will engage with the upwardly curved ends of the projections 13 when the gears are in neutral position. Secured to the inner side of the cover 4 above the screws 14 and depending from the lower edge of said cover are metal clips 17. The clips 17 are apertured to receive the ends of the screws 14 therethrough. The clips 17 through engagement with the screws 14 will hold the cover 4 in position on the housing 1, and, while the blocks 9 with the projections 13 thereon are in neutral position, said screws cannot be removed to release said clips because of engagement of said projections in the grooves 15. In the modification shown in the left portion of Figure 4 there is substituted for the stud screws 14 of the second embodiment vertical stud screws 18, the inter-engaging flanges on the cover 4 and the housing 1 being widened for this purpose. Each stud screw 18 is provided with an annular groove 19. The blocks 7 are provided with lateral projections 20 thereon which when said blocks are in neutral position are adapted to engage with the respective grooves 19 of the screws 18. In the modification shown in the right hand portion of Figure 4, the laterally extending portion on the blocks 7 is numbered 21 and is provided with a vertical lug 22 on its outer upper end for engagement in a diametrical guide slot 23 in the bottom of a stud screw 24 which extends vertically through the inner engaging flanges of the cover and housing. In the modifications shown in Figure 4 the widened flange on the housing 1 is preferably widened over a small portion as in the case of the integral projections 12 of Figures 1 and 2. All of the modifications are preferably provided with the pins 2 and recesses 3 shown in Figures 1 and 2, so as to prevent lateral shifting of the cover on the housing.

It is to be noted that in each embodiment of this invention the means for preventing the removal of the transmission housing cover may be released when the gears are shifted from any position other than the central or inoperative position, affording not only inaccessibility to the gears when it is desired that they be inaccessible, but also simplicity of contruction and accessibility to the gears when it is desired by the owner that they be accessible.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination, a transmission casing, a cover for said casing, gear shift means including a shift lever associated with said cover and extending into said casing, means for locking said gear shift means in a predetermined position, and means for preventing removal of said cover from said casing when said gear shift means is in said position comprising a projection connected to and extending into the interior of said casing, said gear shift means having an extension arranged for cooperation with said projection when the shift means is in said predetermined position, said cover being removable only when said shift means is out of said position.

2. In combination, a transmission casing, a cover for said casing, gear shift means including a shift lever associated with said cover and extending into said casing, means for locking said gear shift means in a predetermined position, means for preventing removal of said cover from said casing when said gear shift means is in said position comprising a projection connected to and extending into the interior of said casing, said gear shift means having an extension arranged for cooperation with said projection when the shift means is in said predetermined position, and means associated with said cover and casing for preventing lateral shifting of the cover on the casing.

3. In combination, a transmission casing, a cover for said casing, gear shift means including a shift lever associated with said cover and extending into said casing, means for locking said gear shift means in a predetermined position, means for preventing removal of said cover from said casing when said gear shift means is in said position comprising a projection connected to and extending into the interior of said casing, said gear shift means having an extension arranged for cooperation with said projection when the shift means is in said predetermined position, and means associated with said cover and casing for preventing lateral shifting of the cover on the casing, said latter means including a concealed pin for connecting the cover to the casing.

In testimony whereof I have hereunto subscribed my name.

COLVIN L. JOHNSON.